(12) United States Patent
Sinha

(10) Patent No.: US 8,560,648 B2
(45) Date of Patent: Oct. 15, 2013

(54) LOCATION CONTROL SERVICE

(75) Inventor: Suyash Sinha, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 337 days.

(21) Appl. No.: 12/943,451

(22) Filed: Nov. 10, 2010

(65) Prior Publication Data

US 2012/0117209 A1     May 10, 2012

(51) Int. Cl.
*G06F 15/177* (2006.01)
(52) U.S. Cl.
USPC .............................................. 709/221; 726/34
(58) Field of Classification Search
USPC ..................... 709/221, 225; 726/34
See application file for complete search history.

(56) References Cited

U.S. PATENT DOCUMENTS

| | | | |
|---|---|---|---|
| 6,457,129 B2 | 9/2002 | O'Mahony | |
| 6,484,262 B1 * | 11/2002 | Herzi | 726/34 |
| 7,155,500 B2 * | 12/2006 | Nikander | 709/223 |
| 7,213,047 B2 * | 5/2007 | Yeager et al. | 709/202 |
| 7,355,506 B2 | 4/2008 | Chandley | |
| 7,380,000 B2 * | 5/2008 | Yaqub et al. | 709/224 |
| 7,786,861 B2 | 8/2010 | Howarth et al. | |
| 7,877,599 B2 * | 1/2011 | Le et al. | 713/154 |
| 7,917,741 B2 * | 3/2011 | Dutton et al. | 713/1 |
| 8,020,192 B2 * | 9/2011 | Wright et al. | 726/1 |
| 8,352,562 B2 * | 1/2013 | Winkler | 709/206 |
| 2007/0018843 A1 | 1/2007 | Cullum | |
| 2008/0083037 A1 | 4/2008 | Kruse et al. | |
| 2008/0172361 A1 * | 7/2008 | Wong et al. | 707/3 |
| 2008/0276326 A1 | 11/2008 | Bhansali et al. | |
| 2009/0241172 A1 | 9/2009 | Sennett et al. | |
| 2010/0100972 A1 | 4/2010 | Lemieux et al. | |
| 2010/0251340 A1 * | 9/2010 | Martin et al. | 726/4 |
| 2011/0029614 A1 * | 2/2011 | Winkler | 709/206 |
| 2011/0093615 A1 * | 4/2011 | Novo Diaz et al. | 709/238 |
| 2011/0106898 A1 * | 5/2011 | Granito et al. | 709/206 |
| 2011/0258442 A1 * | 10/2011 | Casilao et al. | 713/168 |
| 2012/0032834 A1 * | 2/2012 | Weeks | 342/118 |
| 2012/0036564 A1 * | 2/2012 | Gu et al. | 726/5 |
| 2012/0297459 A1 * | 11/2012 | Olshansky et al. | 726/4 |

OTHER PUBLICATIONS

"Mobile Defender", Retrieved at <<http://safefrontier.com/mobile-defender>>, Sep. 8, 2010, pp. 2.
"Prey", Retrieved at<<http://preyproject.com/>>, Sep. 8, 2010, pp. 5.
"Enhanced Computer-Tracking and Recovery Solution from Absolute Software", Retrieved at<<http://www.absolute.com/Shared/Datasheets/ABT-MS-DS-E.sflb.ashx>>, Sep. 8, 2010, pp. 2.

(Continued)

*Primary Examiner* — Brian P Whipple
(74) *Attorney, Agent, or Firm* — Wolfe-SBMC

(57) ABSTRACT

In embodiments of a location control service, location data that identifies the location of a device is stored in a memory module, such as secured non-volatile memory or a storage module, of the device along with a timestamp that correlates to local time at the location of the device. A determination is then made as to whether the location of the device has changed. Functionality of the device can be disabled, and access to data stored on the device restricted, when determining that a change in location of the device was not authorized. Alternatively, the location data can be updated to identify a new location of the device when determining that a change in location of the device was authorized.

20 Claims, 4 Drawing Sheets

(56) References Cited

OTHER PUBLICATIONS

"Computrace Plus with AT-p", Retrieved at <<http://shop.lenovo.com/offers-00/shop--SEUILibrary--controller--e--na--LenovoPortal--en_US--special-offers.workflow:ShowPromo/--All--US--Sitelets--Software--Anti-Theft-Protection.shtml>>, Sep. 8, 2010, pp. 2.

* cited by examiner

LOCATION CONTROL SERVICE

BACKGROUND

Data centers for large corporate entities, such as enterprises and cloud-computing providers, typically include a significant number of server devices that are an enormous capital and operational expense. However, large data centers are generally secure sites and the server devices themselves are typically large enough to be a theft deterrent. This may not be the case for smaller data centers that only include a few, smaller server devices, and other equipment that may be targeted for theft. The rise in device thefts does not only apply to server devices and related equipment. Many consumer devices, such as cell phones and portable computers, are lost or stolen on a daily basis, particularly as these types of devices have become increasingly mainstream and continue to increase in popularity and use.

SUMMARY

This summary is provided to introduce simplified concepts of a location control service that is further described below in the Detailed Description. This summary is not intended to identify essential features of the claimed subject matter, nor is it intended for use in determining the scope of the claimed subject matter.

A location control service is described. In embodiments, location data that identifies the location of a device is stored in a memory module of the device along with a timestamp that correlates to local time at the location of the device. A determination is then made as to whether the location of the device has changed. Functionality of the device can be disabled, and access to data stored on the device restricted, when determining that a change in location of the device was not authorized. Alternatively, the location data can be updated to identify a new location of the device when determining that a change in location of the device was authorized.

In other embodiments, a service authorization can be requested from a network-based service, where the service authorization indicates that a change in location of a device was authorized. Alternatively or in addition, peer verification can be requested from one or more peer devices, where the peer verification indicates that the change in location of the device was authorized. Alternatively or in addition, a key-code input to the device can be compared with a stored key-code to validate the change in location of the device. The device may also be timed-out after a designated duration when determining that the change in location of the device was not authorized and/or when service authorization, peer verification, and key-code validation is not available.

BRIEF DESCRIPTION OF THE DRAWINGS

Embodiments of a location control service are described with reference to the following drawings. The same numbers are used throughout the drawings to reference like features and components.

DETAILED DESCRIPTION

Figure 1:
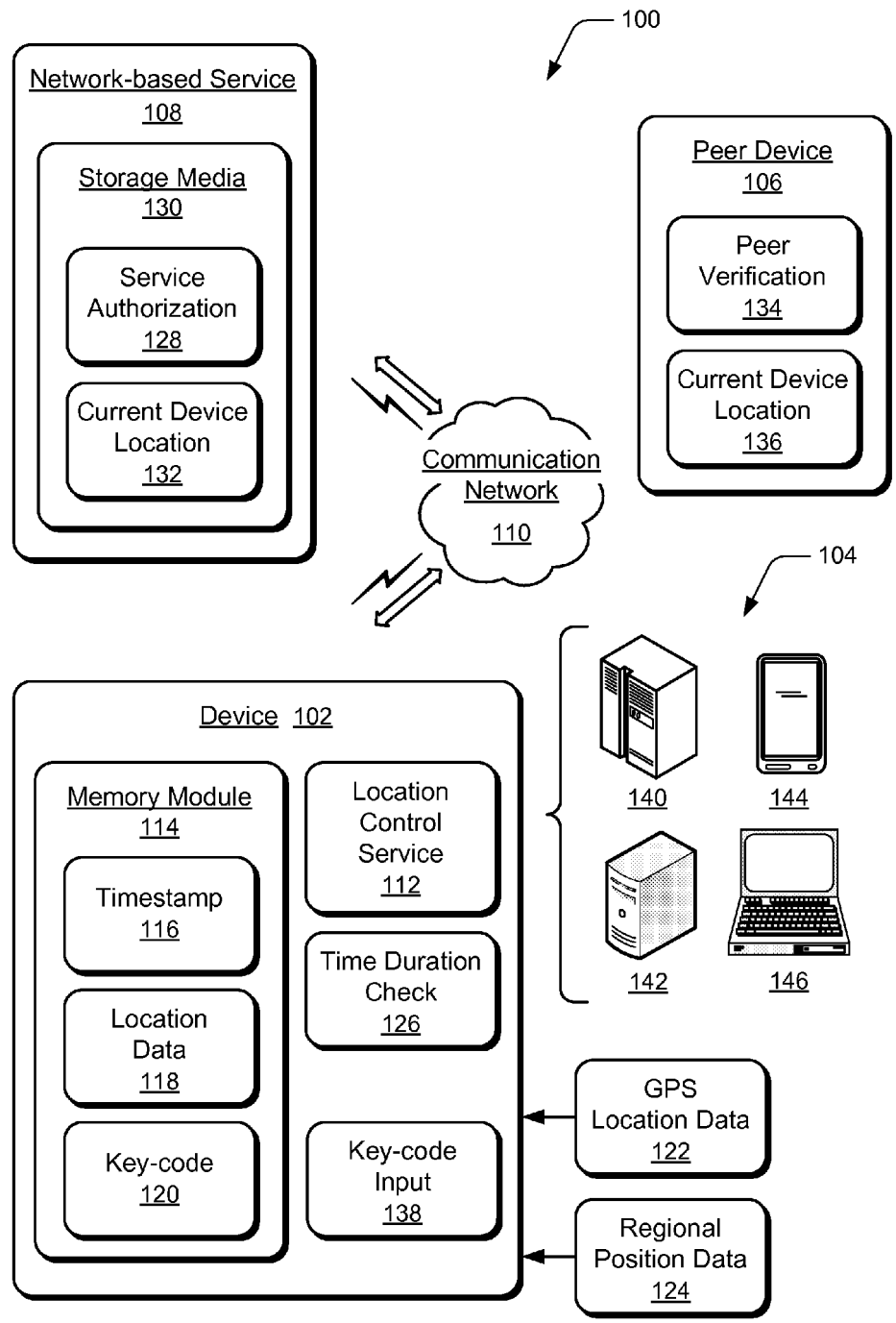
FIG. 1 illustrates an example system in which embodiments of a location control service can be implemented.

A location control service is described. In embodiments, a device, such as server, computer, mobile phone, portable computer, or other similar device can implement a location control service as a deterrent to theft of the device. The location control service can disable device functionality and/or restrict access to data stored on the device when determining that the device has changed locations without authorization. As described herein, authorization for a change in location of a device may be determined from a service authorization obtained from a network-based service, by peer verification obtained from one or more peer devices that are communicatively linked with the device, and/or by manually entered key-code validation.

When a device is first deployed for use or put in service, such as a server device, the device can be initialized with a timestamp and location data. The location data, and updates to the location data, can be obtained as Global Positioning System (GPS) location data and/or other regional position data, such as wireless access point triangulation methods, cellular tower triangulation methods, etc. The GPS location data may be the most accurate because it can indicate the latitude, longitude, and altitude of a device, typically within a couple of meters. The location of a server device, for example, can be monitored for a change in location within an allowed displacement of a few meters. If the device is then moved to another location outside of the allowed displacement without prior authorization, such as when stolen, a location control service that is implemented in the device can disable device functionality and/or restrict access to data stored on the device.

Alternatively or in addition to GPS location data, regional position data can indicate the location of a device based on communications via cellular towers or other network communication equipment that has a known location relative to an approximate location of the device. The location of a mobile phone or portable computer, for example, can be monitored for a change in location within a designated region, such as within a city, state, or other user-designated boundary. If the location of a device is determined as being out of a designated region or boundary, such as when stolen, a location control service that is implemented in the device can disable device functionality and/or restrict access to data stored on the device. For a mobile device that is more likely to change locations and be moved out of a designated region, such as a mobile phone, the location control service can be implemented to initiate a user challenge, such as requiring entry of a password, to continue operation of the device rather than disabling the device functionality.

While features and concepts of the described systems and methods for a location control service can be implemented in any number of different environments, systems, devices, and/or various configurations, embodiments of a location control service are described in the context of the following example devices, systems, and configurations.

FIG. 1 illustrates an example system 100 in which various embodiments of a location control service can be implemented. The example system 100 includes a device 102, which may be configured as any type of device 104, such as a computer, server, client, user, portable, fixed, mobile, and/or wireless device. The example system 100 also includes a peer device 106, which also may be configured as any of the various devices 104 and network connected as a peer of the device 102. The example system also includes a network-based service 108 that may be implemented as a data source and/or remote manager of the various devices, such as if device 102 is registered with the network-based service.

Any of the services and devices can communicate via a communication network 110, which can be implemented to include a wired and/or a wireless network that facilitates data communication. The communication network can also be implemented using any type of network topology and/or communication protocol, and can be represented or otherwise implemented as a combination of two or more networks. The communication network may also include mobile operator networks that are managed by mobile operators, such as a communication service provider, cell-phone provider, and/or Internet service provider. A mobile operator can facilitate mobile data and/or voice communication for any type of a wireless device or mobile phone (e.g., cellular, VoIP, Wi-Fi, etc.). In the event that the communication network does not have a high degree of reliability, particularly for an ad-hoc wireless mesh network, a location control service will continue to operate despite delays and/or packet loss in such networks.

In this example system 100, the device 102 includes a location control service 112 that can be implemented as computer-executable instructions, such as a software application, and executed by one or more processors to implement the various embodiments described herein. Alternatively or in addition, the location control service may be implemented as an independent service separate from the device, or may be implemented as a component of the network-based service. The location control service can be implemented as a deterrent to theft of the various types of devices and, in embodiments, disables the functionality of a device and/or restricts access to data stored on the device when determining that the device has changed locations without authorization. As described herein, authorization for a change in location of a device may be determined from a service authorization, peer verification, and/or key-code validation.

The device 102 includes a memory module 114 that stores, or otherwise maintains, a timestamp 116 that correlates to local time at a location of the device and location data 118 that identifies the location of the device. The memory module also includes a key-code 120 for the device, such as an encrypted code, password, activation key, or other alphanumeric code that presumably only a user or owner of the device would know. The memory module can be implemented as any type of memory and/or suitable electronic data storage, such as a Trusted Platform Module (TPM) (also referred to as a TPM security chip) that securely maintains the timestamp and the location data. TPM-based encrypted storage is particularly secure and tamper-resistant for this purpose.

When a device is first deployed for use or put in service, such as a server device, the device can be initialized with the timestamp and location data. The location data, and updates to the location data, can be obtained as Global Positioning System (GPS) location data 122 and/or other regional position data 124. The GPS location data of a device can indicate the latitude, longitude, and altitude of the device, typically within a couple of meters. The location of a server device, for example, can be monitored for a change in location (also referred to as a location invariant) within an allowed displacement of a few meters. If the device is then moved to another location outside of the allowed displacement without prior authorization, such as when stolen, the location control service 112 can disable device functionality and/or restrict access to data stored on the device.

Alternatively or in addition to the GPS location data 122, the regional position data 124 (also referred to as geographic location data) can indicate the location of a device based on communications via cellular towers or other network communication equipment that has a known location relative to an approximate location of the device. The location of a mobile phone or portable computer, for example, can be monitored for a change in location within a designated region, such as within a city, state, or other user-designated boundary. If the location of a device is determined as being out of a designated region or boundary, such as when stolen, the location control service 112 can disable device functionality and/or restrict access to data stored on the device. For a mobile device that is more likely to change locations and be moved out of a designated region, such as a mobile phone, the location control service can be implemented to initiate a user challenge, such as requiring entry of a password, to continue operation of the device rather than disabling the device functionality. Alternatively or in addition, the location control service can be implemented to send an email message to a user of the device with a link in the message that can be selected by the user, or send a text message to the user who replies back with explicit authorization. In general, many possible defense-in-depth techniques can be used to seek explicit user authorization.

The device 102 maintains a time duration check 126 that may be based on or initialized from the timestamp 116. In embodiments, the location control service 112 can determine whether the location of the device 102 has changed, and the determination can be initiated periodically based on the time duration check, such as every few seconds, minutes, hours, days, etc. As described, the location control service 112 can determine that a change in location of a device was authorized and update the location data 118 that identifies the new location of the device. Alternatively, the location control service can determine that the change in location of the device was not authorized, and disable device functionality and/or restrict access to data stored on the device.

Disabling device functionality can include the location control service initiating a software lockdown phase to register the state of the device, such as stored in the memory module 114, and then lockdown the device. On subsequent reboots of the device, the system can be resumed if the state is cleared from the memory module and/or if a unique activation key is provided, such as a user-input of the key-code. In a symmetric multi-processing system, the kernel can initiate the lockdown. In a multi-node system, a lockdown signal can be communicated to each of the systems from a master controller, and each kernel then initiates the lockdown of a respective system.

In embodiments, the location control service 112 can detect a change in location of the device 102, such as by comparison of the stored location data 118 with GPS location data 122 and/or regional position data 124 that correlates to a current location of the device. The location control service can then request a service authorization 128 from the network-based service 108, where the service authorization may indicate that the change in location of the device was authorized. In this example, the network-based service includes storage media 130 to store or otherwise maintain various data, such as the service authorization 128 and a current device location 132 of the device 102. The storage media can be implemented as any type of memory and/or suitable electronic data storage.

The network-based service 108 may store the current device location 132 of the device 102 if the service is provided with the location data, such as when an owner or user of the device provides the location data to the network-based service. When the location control service requests the service authorization, the network-based service can also attempt to confirm that the change in location of the device was authorized. A change in location of the device may be confirmed by a network operator contacting the owner of the device by email, over SMS, or by any other communication technique. If the location control service 112 at the device 102 receives the service authorization as confirmation that the change in location of the device was authorized, then the location data 118 can be updated to identify the new location of the device. However, if the location control service receives the service authorization as confirmation that the change in location of the device was not authorized, then the location control service 112 can disable device functionality and/or restrict access to data stored on the device.

In an event that a service authorization 128 is not available or is not received from the network-based service 108, the location control service 112 can request peer verification 134 from one or more peer devices (e.g., any of the various devices 104 in this example), where the peer verification may indicate that the change in location of the device was authorized. The peer devices that are communicatively linked to the device 102 for data communication, such as the example peer device 106, may include or have a current device location 136 of the device 102. The networked peer devices may have current device location data for the respective locations of each of the other peer devices, such as when a message is communicated to all of the peer devices that a node is or will be changing location. Alternatively or in addition, each device can periodically communicate its location to the other networked peer devices, and if a peer device changes location and is suspected stolen, the other peer devices can stop communications with the stolen device.

If the location control service 112 at the device 102 receives the peer verification 134, such as in the form of a distributed vote from the peer devices, and if the peer verification indicates that the change in location of the device was authorized, then the location data 118 can be updated to identify the new location of the device. However, if the location control service receives the peer verification as an indication that the change in location of the device was not authorized, then the location control service 112 can disable device functionality and/or restrict access to data stored on the device.

In an event that peer verification 134 is not available or is not received from the one or more peer devices, the location control service 112 can compare a key-code input 138 with the stored key-code 120 to validate the change in location of the device. The key-code input can be received as an input to the device, such as from a user or owner of the device. If the change in location of the device is validated by the key-code comparison, then the location data 118 can be updated to identify the new location of the device. However, if the change in location of the device is not validated by the key-code comparison, then the location control service 112 can disable device functionality and/or restrict access to data stored on the device. Additionally, the location control service 112 can be implemented to time-out the device after a designated duration when determining that the change in location of the device was not authorized. For example, the location control service times-out the device after a number of seconds, minutes, hours, etc. when the change in location of the device is not authorized and/or when service authorization, peer verification, and key-code validation is not available.

Any of the various devices 104 can be configured as the device 102, and may be implemented with any number and combination of differing components as further described with reference to the example device shown in FIG. 4. In this example system 100, a device 104 can be implemented as any one or combination of a server device 140, a computer device 142, an appliance device, an electronic device, or mobile device, such as a mobile phone 144, a portable computer device 146, and/or any other wireless device.

Figure 2:
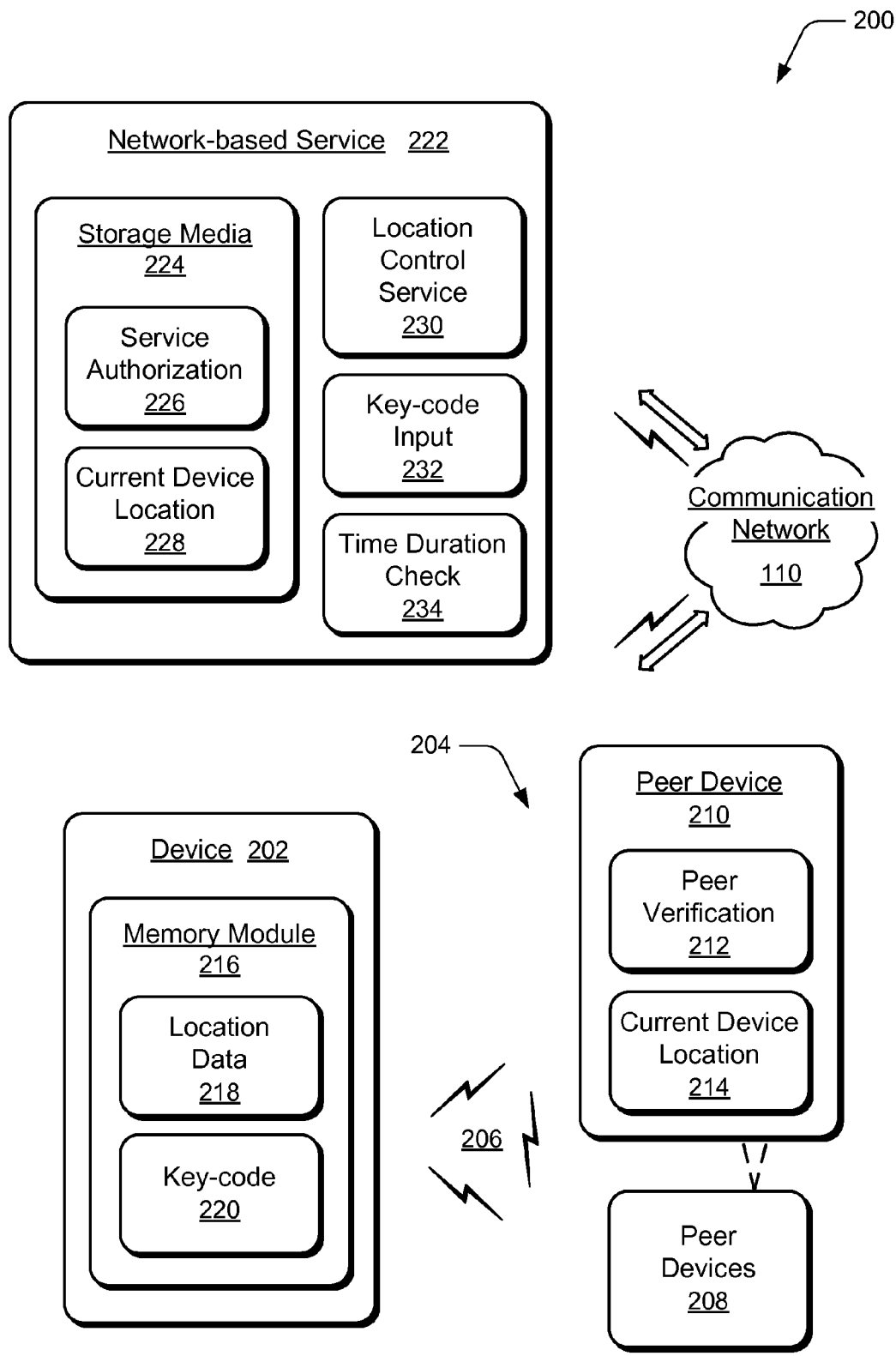
FIG. 2 illustrates another example system in which embodiments of a location control service can be implemented.

FIG. 2 illustrates an example system 200 in which various embodiments of a location control service can be implemented. The example system 200 includes a device 202 and peer devices 204 that may be communicatively linked for data communication via a network 206, such as an ad-hoc wireless mesh network that includes the device and the peer devices as nodes of the network. Alternatively or in addition, any of the devices and services may communicate via the communication network 110 as described with reference to FIG. 1. The peer devices 204 include any number of peer devices 208, such as example peer device 210 that includes peer verification 212 and a current device location 214 of the device 202, if the location is known.

Additionally, the device 202 can be implemented as any of the peer devices 204, and vice-versa, and the device 202 and/or the peer devices 204 may be configured as any of the devices described with reference to FIG. 1. For example, the device includes a memory module 216 that stores, or otherwise maintains, location data 218 that identifies a location of the device and a key-code 220 for the device. The example system also includes a network-based service 222 that may be implemented as a data source and/or remote manager of the various devices, such as if the device 202 and/or the peer devices 204 are registered with the service. The network-based service 222 includes a storage media 224 to store or otherwise maintain various data, such as a service authorization 226 and a current device location 228 of the device 202.

In this example, the network-based service 222 includes a location control service 230 that can be implemented as computer-executable instructions, such as a software application, and executed by one or more processors to implement the various embodiments described herein. The location control service can be implemented to disable the functionality of a device and/or restrict access to data stored on the device when determining that the device has changed locations without authorization. As described herein, authorization for a change in location of a device may be determined from the service authorization 226, peer verification 212, and/or by key-code validation based on a key-code input 232. The network-based service 222 also maintains a time duration check 234 to periodically initiate a determination of whether the location of a device has changed, such as any of the device 202 and/or peer devices 204.

In embodiments, the location control service 230 at the network-based service 222 can detect a change in location of the device 202, such as by comparison of the stored location data 218 with GPS location data and/or regional position data that correlates to a current location of the device. If a change in location is determined, then the location control service can request the service authorization 226 that may indicate the change in location of the device was authorized. If the location control service 230 receives the service authorization as confirmation that the change in location of the device was authorized, then the current device location 228, and the location data 218 at the device 202, can be updated to identify the new location of the device. However, if the location control service receives the service authorization as confirmation that the change in location of the device was not authorized, then the location control service 230 can disable device functionality and/or restrict access to data stored on the device.

In an event that the service authorization 226 is not available, the location control service 230 can request peer verification 212 from one or more of the peer devices 204, where the peer verification may indicate that the change in location of the device was authorized. If the location control service 230 receives the peer verification as an indication that the change in location of the device was authorized, then the current device location 228, and the location data 218 at the device 202, can be updated to identify the new location of the device. However, if the location control service receives the peer verification as an indication that the change in location of the device was not authorized, then the location control service 230 can disable device functionality and restrict access to data stored on the device.

In an event that a peer verification 212 is not available or is not received from the peer devices, the location control service 230 can compare the key-code input 232 with the stored key-code 220 at the device to validate the change in location of the device. If the change in location of the device is validated by the key-code comparison, then the current device location 228, and the location data 218 at the device 202, can be updated to identify the new location of the device. However, if the change in location of the device is not validated by the key-code comparison, then the location control service 230 can disable device functionality and restrict access to data stored on the device. Additionally, the location control service can be implemented to time-out the device 202 after a designated duration when determining that the change in location of the device was not authorized. For example, the location control service times-out the device after a number of seconds, minutes, hours, etc. when the change in location of the device is not authorized and/or when service authorization, peer verification, and key-code validation is not available.

Example method 300 is described with reference to FIG. 3 in accordance with one or more embodiments of a location control service. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Figure 3:
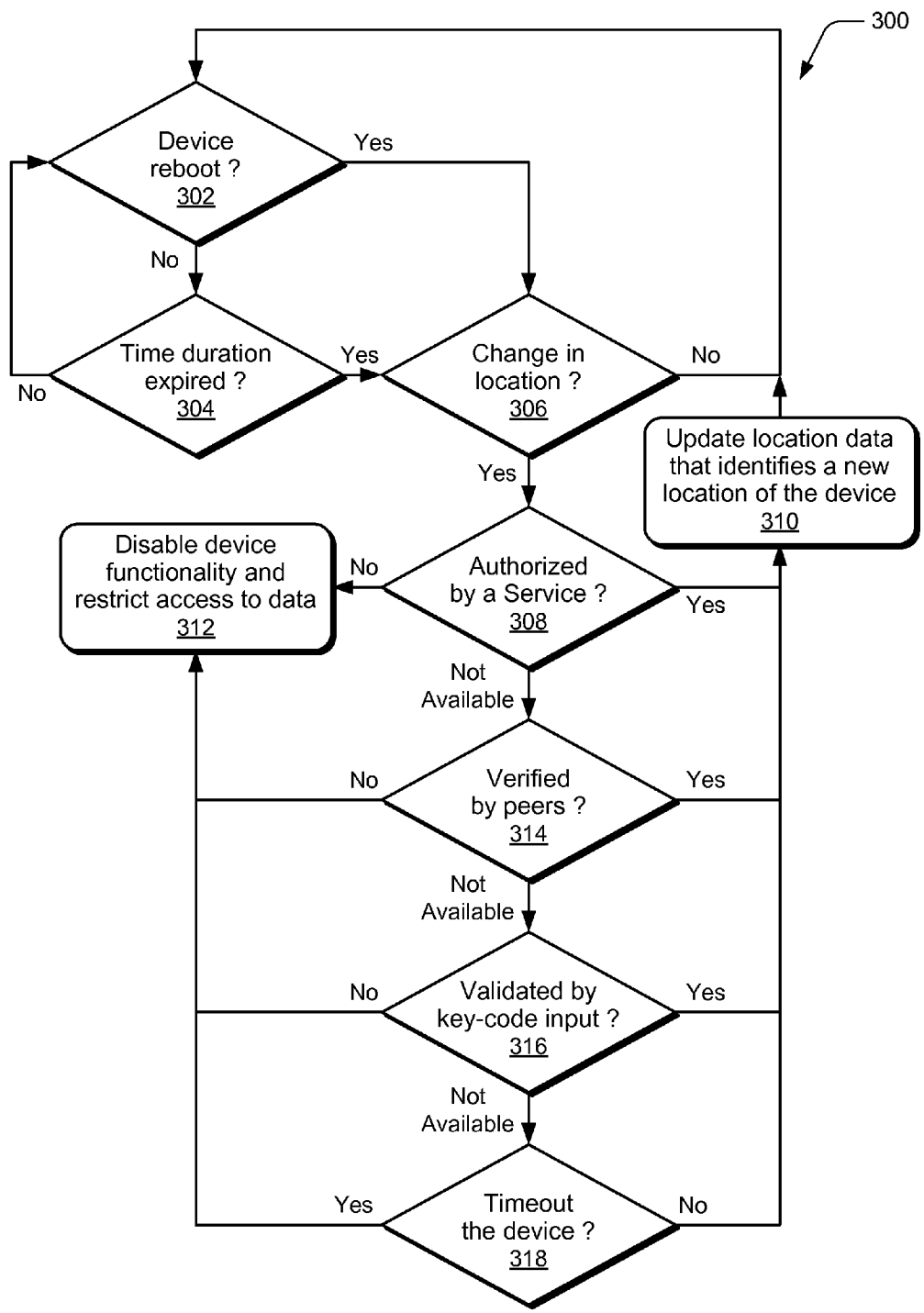
FIG. 3 illustrates example method(s) of a location control service in accordance with one or more embodiments.

FIG. 3 illustrates example method(s) 300 of a location control service, and is described with reference to a device that implements the location control service. The order in which the method blocks are described are not intended to be construed as a limitation, and any number of the described method blocks can be combined in any order to implement a method, or an alternate method.

At block 302, a determination is made as to whether a device is rebooted. For example, the device 102 (FIG. 1) may be rebooted, such as when a user restarts the device, and the location control service 112 determines that the device is rebooted. If the device is not rebooted (i.e., "no" from block 302), then at block 304, a determination is made as to whether a time duration has expired. For example, the location control service periodically initiates determining whether the location of the device has changed based on a time duration, such as every few seconds, minutes, hours, days, etc. If the time duration has not expired (i.e., "no" from block 304), then the method continues at block 302.

If the device is rebooted (i.e., "yes" from block 302), or if the time duration has expired (i.e., "yes" from block 304), then at block 306, a determination is made as to whether the device has changed locations. For example, the location control service 112 determines whether the location of the device 102 has changed based on a comparison of the stored location data 118 with GPS location data 122 and/or regional position data 124 that correlates to a current location of the device. In embodiments, the location data that identifies the location of the device is stored in the memory module 114 of the device along with a timestamp 116 that correlates to local time at the location of the device. The timestamp and the location data can be stored in a Trusted Platform Module (TPM) that securely maintains the timestamp and the location data. If the device has not changed location (i.e., "no" from block 306), then the method continues at block 302.

If the determination is that the device has changed location (i.e., "yes" from block 306), then at block 308, a determination is made as to whether the change in location of the device was authorized. For example, the location control service 112 requests a service authorization 128 from a network-based service 108, and the service authorization may indicate that the change in location of the device was authorized. If the change in location of the device was authorized, such as when a service authorization is received from the network-based service (i.e., "yes" from block 308), then at block 310, the location data is updated to identify a new location of the device. For example, the location control service initiates an update to the location data 118 to identify the new location of the device. The method can then continue at block 302 from block 310.

If the change in location of the device was not authorized (i.e., "no" from block 308), then at block 312, device functionality is disabled and/or access to data stored on the device is restricted. For example, the location control service 112 disables functionality of the device 102 and restricts access to data stored on the device when determining that the change in location of the device was not authorized. If service authorization is not available at block 308, then at block 314, a determination is made as to whether the change in location of the device can be verified by peer devices that are communicatively linked to the device for data communication. For example, the device 102 may be networked with additional devices, such as in an ad-hoc wireless mesh network, and the location control service 112 requests peer verification 134 from the peer devices. The peer verification may indicate that the change in location of the device was authorized.

If the change in location of the device was authorized, such as indicated by peer verification (i.e., "yes" from block 314), then at block 310, the location data is updated to identify a new location of the device. For example, the location control service 112 initiates an update to the location data 118 to identify the new location of the device, and the method continues at block 302. If the change in location of the device was not authorized, such as indicated by peer verification (i.e., "no" from block 314), then at block 312, device functionality is disabled and/or access to data stored on the device is restricted. For example, the location control service 112 disables functionality of the device 102 and/or restricts access to data stored on the device when determining that the change in location of the device was not authorized.

If peer verification is not available at block 314, then at block 316, a determination is made as to whether the change in location of the device can be validated by a key-code input to the device. For example, the location control service 112 compares the key-code input 138 to the device with the stored key-code 120 to validate the change in location of the device. The key-code input can be received as an input to the device, such as from a user or owner of the device. If the change in location of the device is validated by the key-code comparison (i.e., "yes" from block 316), then at block 310, the location data is updated to identify a new location of the device. For example, the location control service 112 initiates an update to the location data 118 to identify the new location of the device, and the method continues at block 302. If the change in location of the device is not validated by the key-code comparison (i.e., "no" from block 316), then at block 312, device functionality is disabled and/or access to data stored on the device is restricted. For example, the location control service 112 disables functionality of the device 102 and restricts access to data stored on the device when determining that the change in location of the device was not authorized.

If validation by key-code input is not available at block 316, then at block 318, a determination is made as to whether the device is timed-out. For example, the location control service 112 times-out the device after a designated duration when determining that the change in location of the device was not authorized and/or when service authorization, peer verification, and key-code validation is not available. If the device is not timed-out (i.e., "no" from block 318), such as when receiving a notice update that the change in location of the device was authorized during the designated duration, then at block 310, the location data is updated to identify a new location of the device. For example, the location control service 112 initiates an update to the location data 118 to identify the new location of the device, and the method continues at block 302. If the device is timed-out (i.e., "yes" from block 318), then at block 312, device functionality is disabled and/or access to data stored on the device is restricted. For example, the location control service 112 disables functionality of the device 102 and restricts access to data stored on the device.

Figure 4:
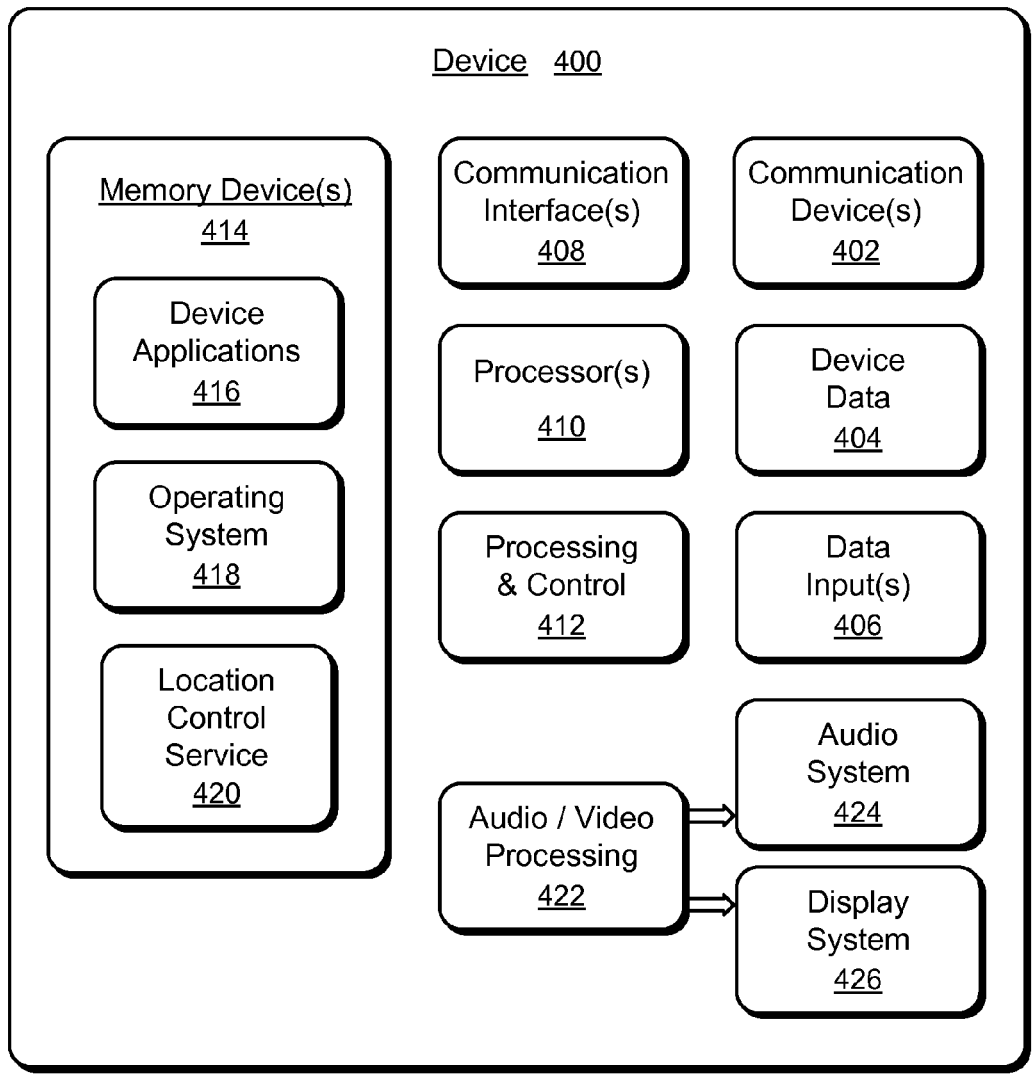
FIG. 4 illustrates various components of an example device that can implement embodiments of a location control service.

FIG. 4 illustrates various components of an example device 400 that can be implemented as any of the devices, or services implemented by devices, described with reference to the previous FIGS. 1-3. In embodiments, the device may be implemented as any one or combination of a fixed or mobile device, in any form of a consumer, computer, server, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 400 includes communication devices 402 that enable wired and/or wireless communication of device data 404, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 406 via which any type of data, media content, and/or inputs can be received, such as user-selectable inputs, messages, communications, music, television content, recorded video content, and any other type of audio, video, and/or image data received from any content and/or data source.

The device 400 also includes communication interfaces 408, such as any one or more of a serial, parallel, network, or wireless interface. The communication interfaces provide a connection and/or communication links between the device and a communication network by which other electronic, computing, and communication devices communicate data with the device.

The device 400 includes one or more processors 410 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 412. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 400 also includes one or more memory devices (e.g., computer-readable storage media) 414 that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communications media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. The term modulated data signal means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 414 provides data storage mechanisms to store the device data 404, other types of information and/or data, and various device applications 416. For example, an operating system 418 can be maintained as a software application with a memory device and executed on the processors. The device applications may also include a device manager, such as any form of a control application, software application, signal processing and control module, code that is native to a particular device, a hardware abstraction layer for a particular device, and so on. In this example, the device applications include a location control service 420, such as when device 400 is implemented as a location controlled device. The location control service is shown as a software module and/or computer application. Alternatively or in addition, the location control service can be implemented as hardware, software, firmware, fixed logic, or any combination thereof.

The device 400 also includes an audio and/or video processing system 422 that generates audio data for an audio system 424 and/or generates display data for a display system 426. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device.

Although embodiments of a location control service have been described in language specific to features and/or methods, the subject of the appended claims is not necessarily limited to the specific features or methods described. Rather, the specific features and methods are disclosed as example implementations of a location control service.

The invention claimed is:

1. A computer-implemented method, comprising:
   storing a timestamp that correlates to local time at a location of a device, the timestamp stored in a memory module of the device;
   storing location data that identifies the location of the device, the location data stored in the memory module of the device;
   initiating a periodic check of the location of the device, the periodic check initialized from the timestamp;
   determining whether the location of the device has changed;
   requesting peer verification from one or more peer devices that indicates the change in location of the device was authorized; and
   updating the location data that identifies a new location of the device responsive to receiving the peer verification.

2. A computer-implemented method as recited in claim 1, further comprising:
   requesting a service authorization from a network-based service that indicates the change in location of the device was authorized; and
   updating the location data that identifies a new location of the device responsive to receiving the service authorization.

3. A computer-implemented method as recited in claim 1, wherein the one or more peer devices are communicatively linked to the device for data communication.

4. A computer-implemented method as recited in claim 1, further comprising:
   comparing a key-code input to the device with a stored key-code to validate the change in location of the device; and
   updating the location data that identifies a new location of the device responsive to validating the key code.

5. A computer-implemented method as recited in claim 1, further comprising disabling device functionality responsive to a determination that a change in location of the device was not authorized.

6. A computer-implemented method as recited in claim 5, further comprising restricting access to data stored on the device when said disabling the device functionality.

7. A computer-implemented method as recited in claim 1, wherein the location data comprises at least one of GPS location data or regional position data that correlates to the location of the device.

8. A computer-implemented method as recited in claim 1, wherein the timestamp and the location data are stored in a Trusted Platform Module (TPM) that securely maintains the timestamp and the location data.

9. A device, comprising:
   a memory module configured to store a timestamp that correlates to local time at a location of the device, and location data that identifies the location of the device;
   a processor and memory to implement a location control service configured to:
      initiate a periodic check of the location of the device, the periodic check initialized from the timestamp;
      determine whether the location of the device has changed;
      request peer verification from one or more peer devices that indicates a change in location of the device was authorized;
      disable device functionality and restrict access to data stored on the device responsive to a determination that the change in location of the device was not authorized; and
      update the location data that identifies a new location of the device responsive to a determination that the change in location of the device was authorized.

10. A device as recited in claim 9, wherein the location control service is further configured to request a service authorization from a network-based service that indicates the change in location of the device was authorized.

11. A device as recited in claim 9, wherein the one or more peer devices are communicatively linked to the device for data communication.

12. A device as recited in claim 9, wherein the location control service is further configured to compare a key-code input to the device with a stored key-code to validate the change in location of the device.

13. A device as recited in claim 9, wherein the location control service is further configured to time-out the device after a designated duration responsive to a determination that the change in location of the device was not authorized.

14. A device as recited in claim 9, wherein the location data comprises at least one of GPS location data or regional position data that correlates to the location of the device.

15. A device as recited in claim 9, wherein the memory module comprises a Trusted Platform Module (TPM) that securely maintains the timestamp and the location data.

16. A networked system, comprising:
   peer devices communicatively linked for data communication;
   a first peer device that implements a location control service configured to:
      determine whether a location of the first peer device has changed;
      request peer verification from at least a second peer device that indicates a change in location of the first peer device was authorized; and
      update location data that identifies a new location of the first peer device responsive to a determination that the change in location of the first peer device was authorized.

17. A system as recited in claim 16, wherein the location control service is further configured to disable device functionality and restrict access to data stored on the first peer device responsive to a determination that a change in location of the first peer device was not authorized.

18. A system as recited in claim 16, wherein the location control service is further configured to at least one of:
   request a service authorization from a network-based service that indicates the change in location of the first peer device was authorized; or
   compare a key-code input to the first peer device with a stored key-code to validate the change in location of the first peer device.

19. A system as recited in claim 16, wherein the location control service is further configured to time-out the first peer device after a designated duration responsive to a determination that the change in location of the first peer device was not authorized.

20. A computer-implemented method as recited in claim 5, further comprising timing-out the device after a designated duration responsive to the determination that the change in location of the device was not authorized.

\* \* \* \* \*